(12) United States Patent
Timms

(10) Patent No.: US 6,467,998 B1
(45) Date of Patent: Oct. 22, 2002

(54) SELF-REGULATING WEIRS AND FISHWAYS

(76) Inventor: Cyril Anthony Timms, Villa Farm, Isle Brewers, Taunton, Somerset (GB), TA3 6QL (*) Notice: Subject to any disclaimer, the term of this patent is extended or adjusted under 35 U.S.C. 154(b) by 0 days.

(21) Appl. No.: 09/700,348

(22) PCT Filed: May 11, 1999

(86) PCT No.: PCT/GB99/01493

§ 371 (c)(1),
(2), (4) Date: Nov. 14, 2000

(87) PCT Pub. No.: WO91/00940

PCT Pub. Date: Jan. 24, 1991

(30) Foreign Application Priority Data

May 14, 1998 (GB) ............................................. 9810192

(51) Int. Cl.[7] .............................. E02B 7/40; E02B 7/30; E02B 7/36
(52) U.S. Cl. ........................ 405/104; 405/103; 405/87; 405/81
(58) Field of Search ............................ 405/81, 87, 92, 405/93, 94, 96, 97, 103, 104, 105

(56) References Cited

U.S. PATENT DOCUMENTS 4,963,057 A * 10/1990 Fournier ...................... 405/93
5,125,766 A * 6/1992 De Wit ........................ 405/94
5,139,364 A * 8/1992 Takahashi et al. ............ 405/81
5,171,102 A * 12/1992 De Wit ........................ 405/87
5,460,462 A * 10/1995 Regan ......................... 405/96
5,516,230 A * 5/1996 Bargeron et al. ............. 405/92

FOREIGN PATENT DOCUMENTS

| GB | 2147933 A | * | 5/1985 | ............. E02B/7/42 |
| GB | 2294079 A | * | 10/1995 | ............. E02B/7/40 |
| GB | 2299920 A | * | 10/1996 | ............. E02B/8/08 |
| WO | WO 91/00940 | * | 1/1991 | ............. E02B/7/42 |

* cited by examiner

*Primary Examiner*—Thomas B. Will
*Assistant Examiner*—Alexandra K. Pechhold
(74) *Attorney, Agent, or Firm*—Melvin I. Stoltz

(57) ABSTRACT

A self-regulating tilting weir comprises a tiltable weir gate over which the water flows, the weir gate being hinged at its lower edge (3) to the base of a support frame (1) and counterbalanced by floats (4) located upstream of the weir gate so that the level of water is raised in response to a fall in the water level upstream of the weir gate and is lowered in response to an increase in the water level upstream of the weir gate, the weir gate being connected to the floats (4) by chains or cables (5) which pass over pulley wheels (6), and devices (7, 8) being provided for effecting vertical movement of the pulley wheels (6) relative to the support frame (1). A self-regulating fishway (FIGS. 9 to 11) is provided alongside the weir.

8 Claims, 12 Drawing Sheets

SELF-REGULATING WEIRS AND FISHWAYS

FIELD OF THE INVENTION

This invention relates to self-regulating weirs and fishways.

Water control structures are well known devices, variously known as sluices, penstocks, gates or weirs, which control the flow of water by means of fixed or moving barriers. There is a special type of weir, known as a tilting or pivoted weir, in which the water flow is regulated by an inclined plane adjusted to different heights according to the upstream water level that is required. The dammed water builds up to the required level, before flowing over the edge of the weir to a lower level.

Water flow can, however, be erratic over any given period and frequent adjustment of a tilting weir can become necessary to suit changing conditions, particularly in order to release maximum flow in the case of flash floods. Also, by nature of its function, the weir may be difficult of access and distant from service facilities.

Ideally, therefore, a tilting or pivoted weir should meet the following requirements:
a) automatic self-regulation of water flow,
b) simple adjustment to vary the controlled water level that is required,
c) automatic response to flood or drought conditions,
d) automatic response to release floating clogging material,
e) availability of manual override,
f) mechanical operation independent of any external power source,
g) simple components requiring minimum attention,
h) the control gear should not be subject to abrasion or clogging by waterborne or submerged detritus,
i) facility to flush out submerged detritus,
j) the upstream level control has priority over downstream level,
k) all operations must be safe to use by a lone operator, and
l) there should be a facility for migratory fish movement.

It is an object of a first aspect of the present invention to provide an improved form of tilting or pivoted weir. It is a more specific object of said first aspect of the present invention to provide an improved form of self-regulating tilting or pivoted weir which meets all or substantially all of the above requirements.

In my British Patent Specification No. 2 294 079B, to which reference should be made, there is described and claimed a counterbalanced, self-regulating tilting weir comprising a tiltable weir gate over which the water flows, the weir gate being hinged at its lower edge to the base of a rectangular support frame and counterbalanced by float means located upstream of the weir gate so that the level of the weir is raised in response to a fall in the water level upstream of the weir gate and is lowered in response to an increase in the water level upstream of the weir gate, the weir gate being connected to the float means by chains which pass over sprockets mounted on an operating shaft carried by the frame, and means being provided for manual operation of the weir, over-riding the action of the float means and locking the weir gate in a desired position regardless of the water level.

It is a further object of the first aspect of the present invention to provide improvements in the tilting weir described and claimed in Patent Specification No. 2 294 079.

A second aspect of the present invention is concerned with the provision of a self-regulating fishway, allowing migratory fish to pass by an obstruction despite variations in river level upstream and downstream of the obstruction. If fluctuations in flow are excessive then a self-regulating tilting or pivoted weir can be used in parallel with the fishway to moderate the variations in water level to suit the self-regulating fishway.

Channels specifically designed to allow migratory fish to pass an obstruction are referred to herein as fishways. The most common fish pass profiles to be installed in fishway channels are of the vertical slot, Denil, or pool and weir type. Although there are other fish passage profiles in use throughout the world, the present invention is concerned primarily with fishways incorporating the proven profiles and dimensional relationships of the fish pass profiles referred to above.

Fishways are normally a fixture with an incline determined by the location and the habits of the local fish species. However, as mentioned above, river flows can be erratic for many different reasons and produce constantly changing levels. If a fishway is a fixture, it can be inundated as a result of excessive flow or can become ineffective if the upstream water level falls below the entrance sill. A manually adjustable entrance sill level may require frequent adjustment, while the location and function of the fishway can make it remote from a service base, with difficult access.

General elements of fishway/fish pass efficiency which are recognised as important to their design include the following:
a) the need to optimise the speed and success of fish passage to minimise delay, stress, damage and fallback of the fish,
b) the need to minimise water use where there are competing water requirements,
c) the need to maximise the range of stream flow under which the fishway is operable by matching the fish pass operation to flows during the period of desired fish passage,
d) the need to minimise construction, operation and maintenance costs by using construction methods and materials appropriate to the remoteness, geometric, hydrologic and geologic characteristics of the site, and
e) allowance for the clearance of debris.

It is an object of the second aspect of the present invention to provide an improved form of fishway, particularly a self-regulating fishway which meets the above requirements.

SUMMARY OF THE INVENTION

According to a first aspect of the present invention there is provided a counterbalanced, self-regulating tilting weir comprising a tiltable weir gate over which the water flows, the weir gate being hinged at its lower edge to the base of a support frame and counterbalanced by float means located upstream of the weir gate so that the level of the weir is raised in response to a fall in the water level upstream of the weir gate and is lowered in response to an increase in the water level upstream of the weir gate, the weir gate being connected to the float means by chains or cables which pass over pulley wheels, and means being provided for effecting vertical movement of the pulley wheels relative to the support frame.

The means for effecting vertical movement of the pulley wheels may comprise vertical lift spindles operated, via a worm gear, by means of a removable hand crank.

Means are preferably provided for adjustment of the operating angles of the chains or cables, and the weight, number and position of the floating counterbalances.

Means may also be provided for operating the weir manually overriding the automatic action and fixing the weir either fully open or fully closed as required, regardless of the flow conditions.

According to a second aspect of the present invention there is provided a self-regulating fishway comprising a tiltable chute containing a fish pass profile, the chute being arranged for tilting movement under the action of one or more floats positioned at or adjacent to the upstream end of the chute so that the required relative water depth is maintained at the chute entrance, the upstream level being so regulated that the chute incline does not exceed maximum desirable limit for the specific fish pass profile which is utilised.

The float or floats at the upstream end of the chute preferably incorporate a submersed buoyant bulb profile extending upstream of the chute entrance. The bulb profile acts in substantially the same way as that located just below the waterline on the bow of a modern commercial ship, diverting the main force of water to either side so that the majority of floating debris is deflected from the chute entrance, whilst desirable flow is maintained.

The flow through the self-regulating fishway is thus maintained substantially constant, providing a virtually debris-free flow from upstream and fish-attracting velocity at the downstream entrance.

Provision is preferably made for cables to be attached to both sides of the upstream end of the chute, the other ends of the cables being attached to the headwall, or other convenient point, in order to maintain the desired alignment of the fishway with the normal flow.

Regulation of the upstream water level for the self-regulating fishway is preferably provided by means of the self-regulating weir in accordance with the first aspect of the invention and the invention thus provides an installation comprising a self-regulating weir and a self-regulating fishway, each having the features defined above.

BRIEF DESCRIPTION OF THE DRAWINGS

Figure 1:
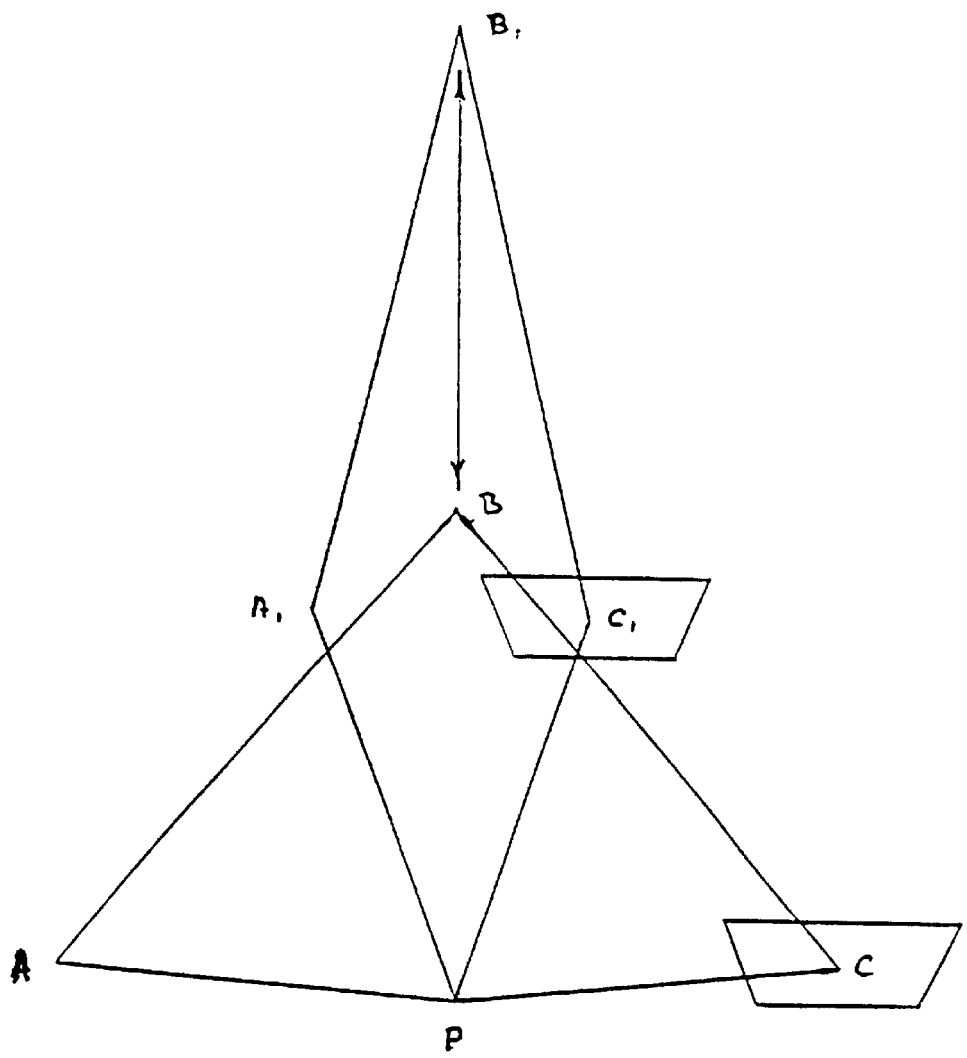
FIG. 1 illustrates the principles of operation of a self-regulating counterbalanced weir.
Figure 2:
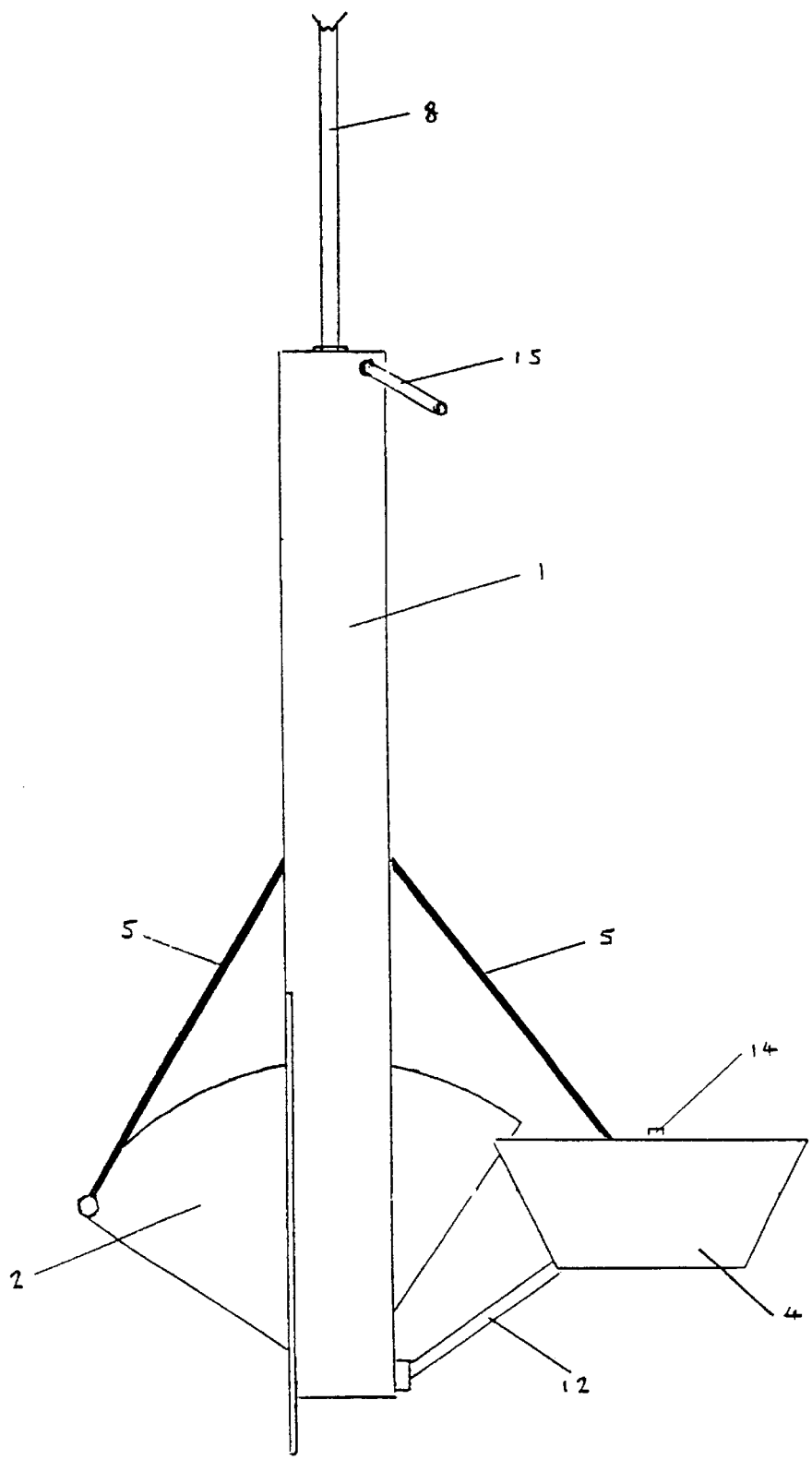
FIG. 2 is a side elevation of the tilting weir of the present invention.
Figure 3:
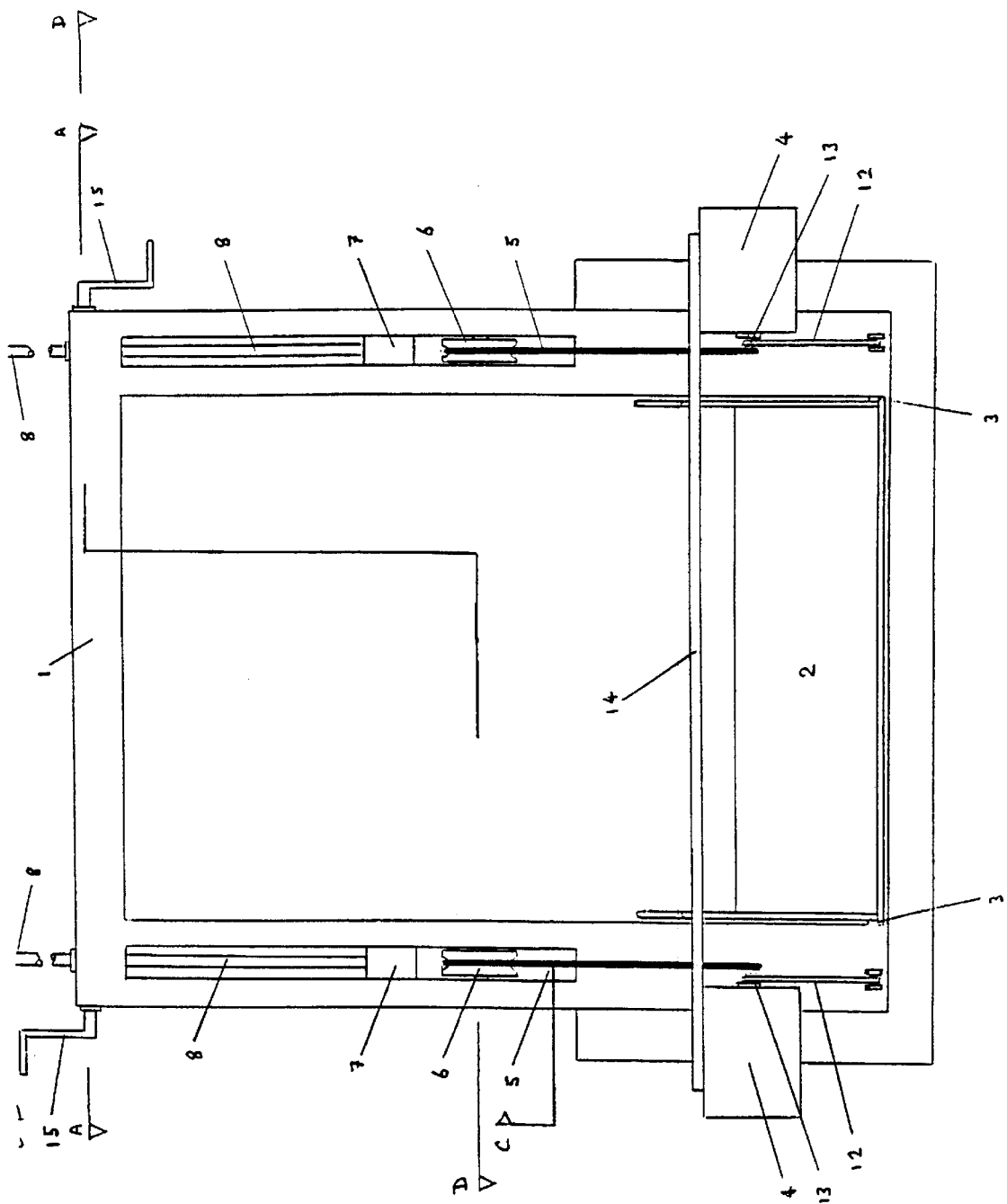
FIG. 3 is an upstream elevation of the weir shown in FIG. 2.
Figure 4:
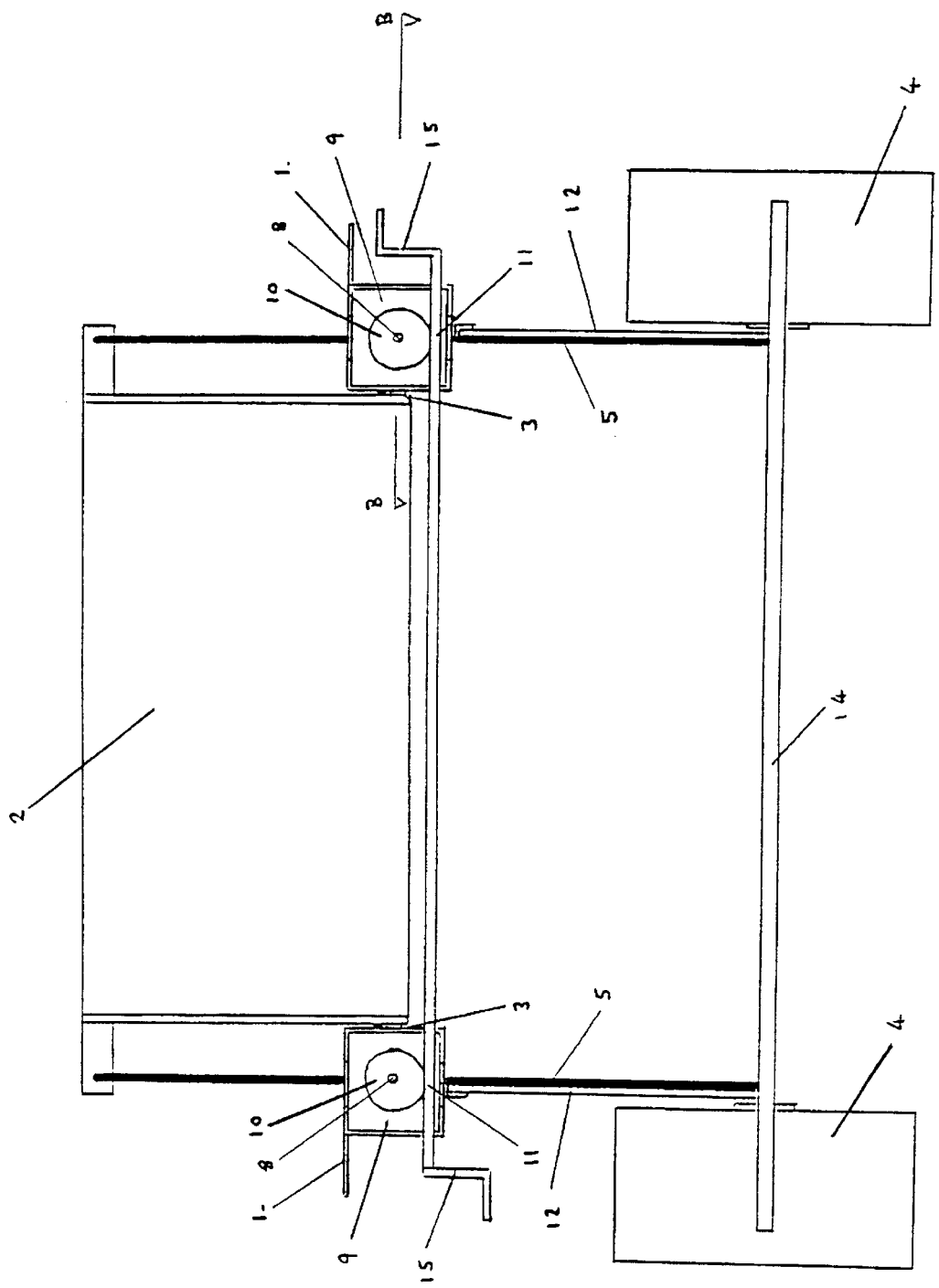
FIG. 4 is a plan/sectional view along the line A—A of FIG. 3.
Figure 5:
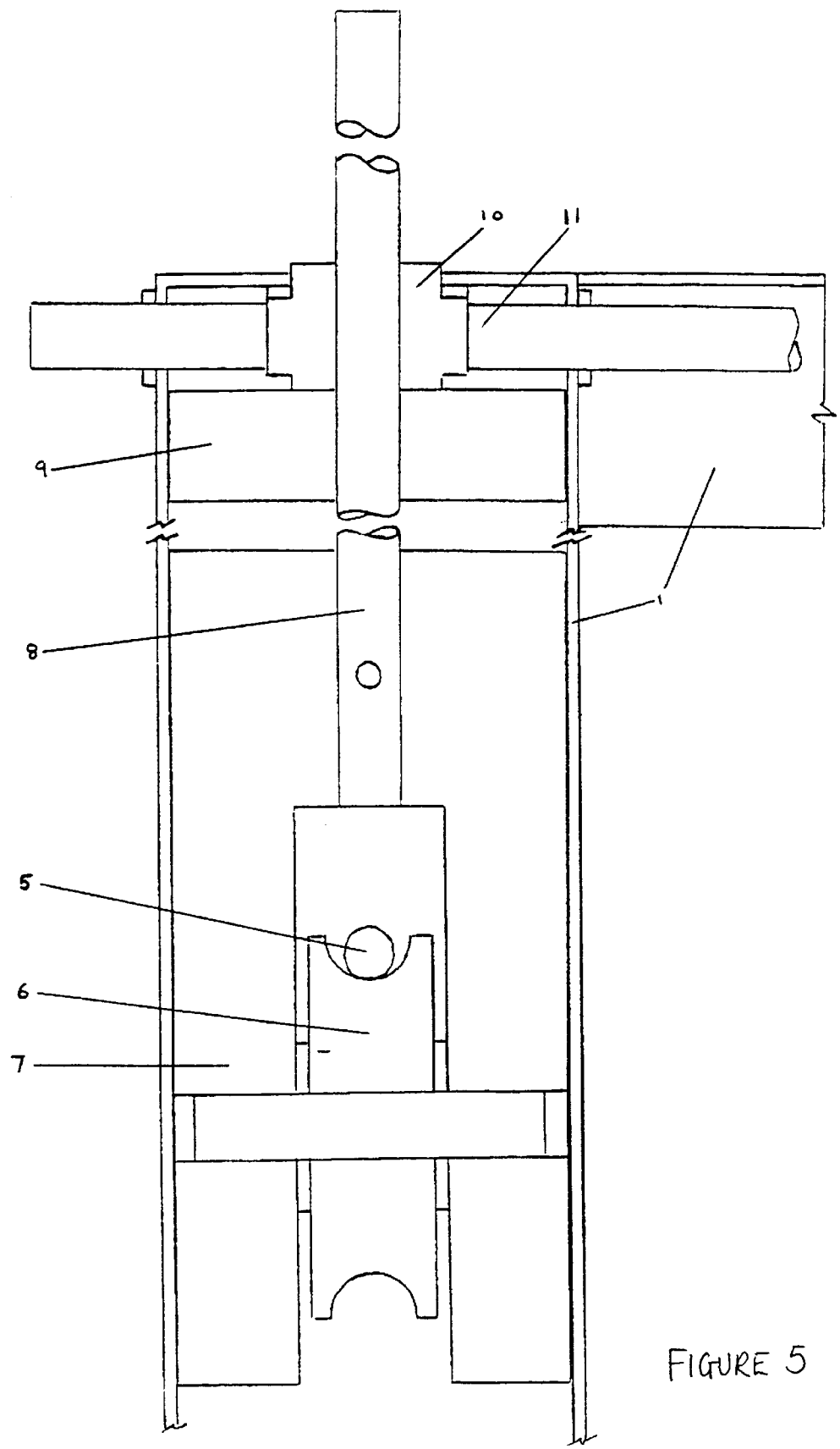
FIG. 5 is a sectional view along the line B—B of FIG. 4.
Figure 6:
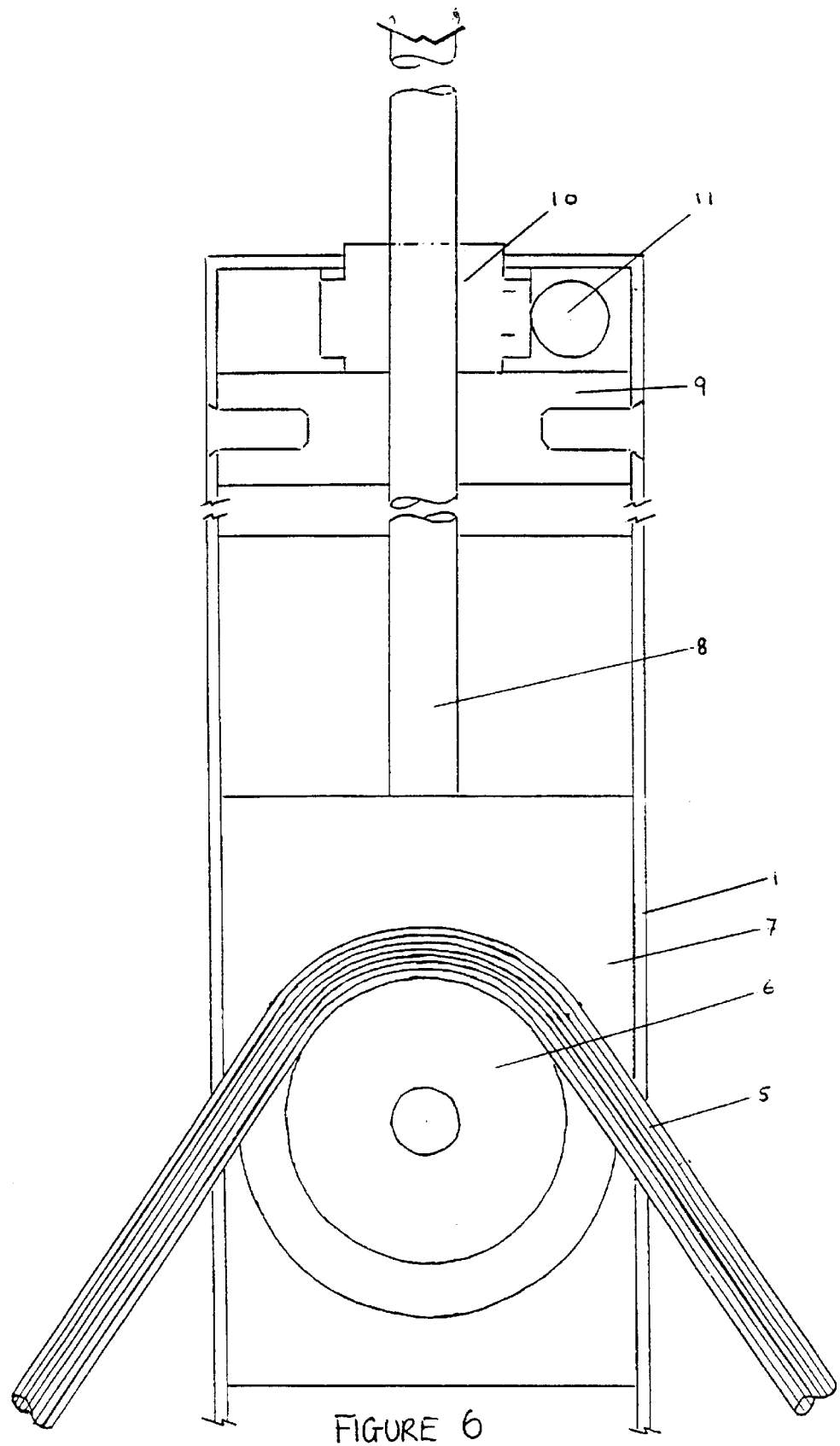
FIG. 6 is a sectional view along the line C—C of FIG. 3.
Figure 7:
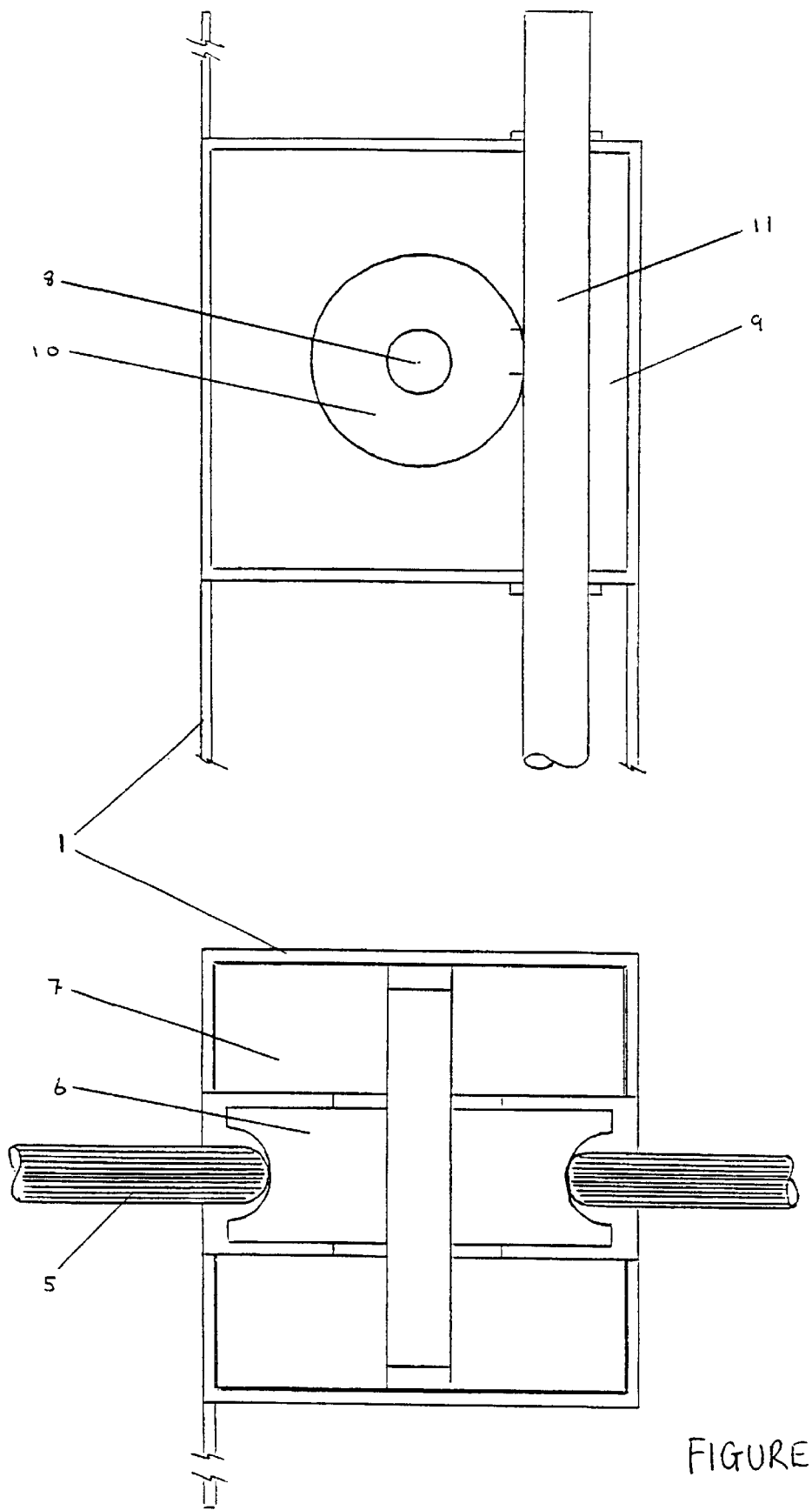
FIG. 7 is a sectional view along the line D—D of FIG. 3.
Figure 8:
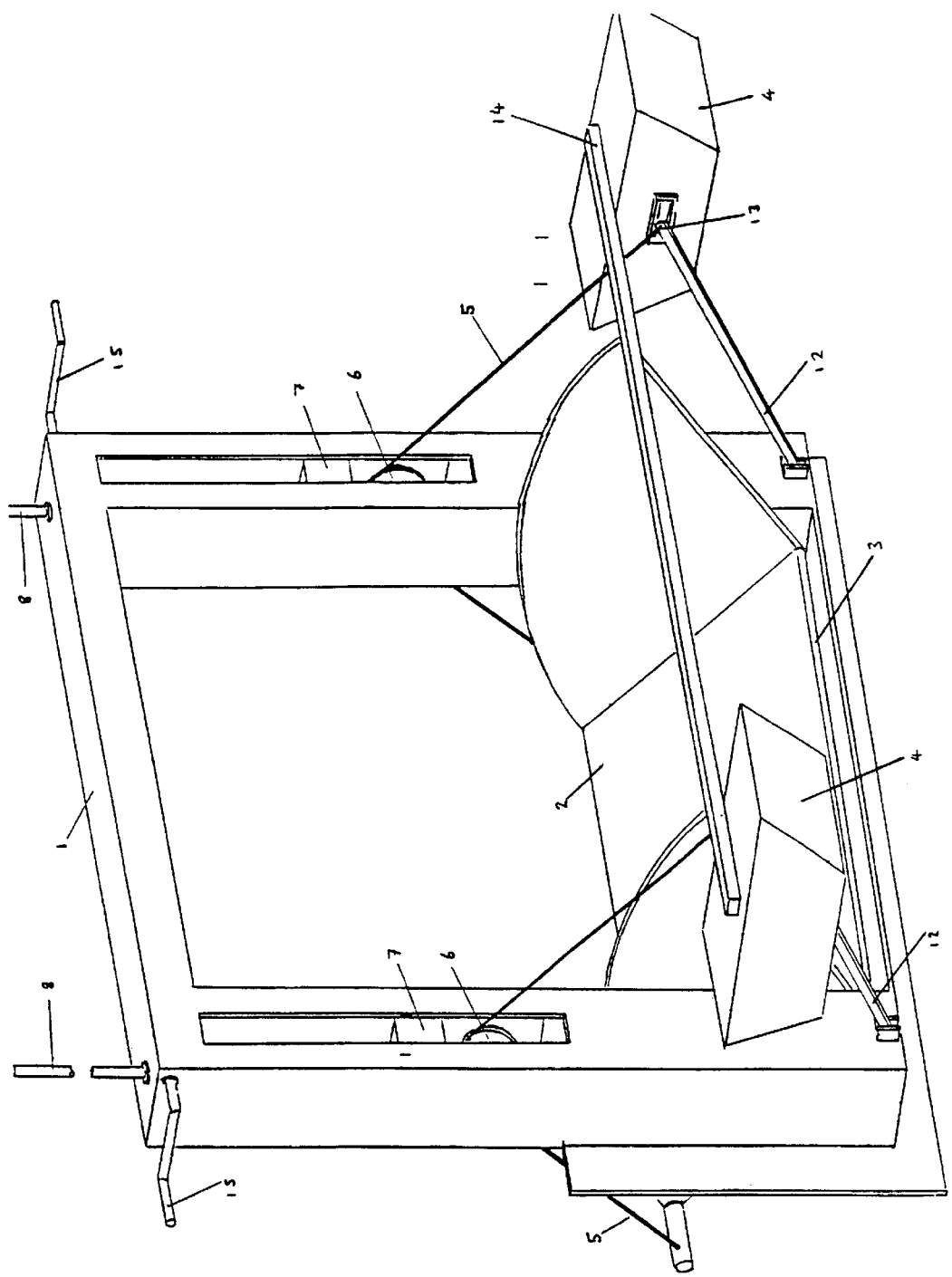
FIG. 8 is an upstream isometric view of the weir of FIG. 2.

As shown in FIG. 1, quadrilaterals A-B-C-P and A1-B1-C1-P have perimeters of equal length with point P being a fixed location.

A-P and P-C are equal in length with a fixed dimension. Point B can be moved vertically in a straight line towards or away from point P so as to alter the location of A to A1 and B to B1, or any position in between.

Individual dimensions A-B, B-C, A1-B1 and B1-C1 can vary, but the total distance A-B-C is constant and equal to A1-B1-C1.

APPLICATION OF THE PRINCIPLE

Weir A-P pivots about point P and is controlled by the floating counterbalance C via the flexible connection A-B-C. Counterbalance C is held at a constant distance from point P by a strut P-C which has a length equal to that of the weir A-P.

Pulley wheel at point B is vertically adjustable within prescribed limits to suit the needs of the design and flexible connection A-B-C is free to traverse point B allowing the counterbalance C to control the position of the weir A-P at all times. Adjustment of the automatically maintained water level is achieved by raising or lowering the pulley wheel at point B as appropriate.

It will thus be seen that the application of the principles outlined above provides automatic self-regulation with mechanical simplicity and adjustment by one simple operation.

FIGS. 2 to 8 show the self-regulating tilting weir in a median regulating position, the weir maintaining the upstream water at a required level by the action of the floating counterbalance weights. If the upstream water level falls, the floating counterbalance weights will follow and lift the weir accordingly, thus damming the flow to restore the required level upstream of the weir. If the upstream water level rises, the floating counterbalance weights will follow and will lower the weir accordingly, thus releasing greater flow to restore the required upstream level.

In times of drought or flash flood, the weir will close or open to its respective extreme limits. Floating material tending to clog the weir will cause the weir plate to fall as the upstream level rises and the increased flow will then force the detritus on downstream. Any build-up of silt can be flushed downstream by lowering the weir manually to the bottom limit. In an emergency situation, the weir can be closed or opened manually by raising or lowering the weir to the relevant extreme limit.

The weir of the present invention (the construction and mode of operation of which will now be described in detail with reference to FIGS. 2 to 8) thus satisfies requirements a) to k) referred to in the introduction, and the requirement I), i.e. to cater for migratory fish movement, is dealt with by the use of the fishway described below in detail with reference to FIGS. 9 and 10.

As shown in FIGS. 2 to 8, the self-regulating weir comprises a generally rectangular frame 1 and a tilting weir plate with vertical sides 2. Means (not shown) are provided for sealing the weir plate against the frame 1 so that there is no substantial water flow between the weir plate and the frame 1. The weir plate is hinge mounted on the base of the support frame 1 at the invert end 3 and is counterbalanced by floating weights 4. The floating weights 4 are held in place by struts 12 which are hinged at one end at invert level 3 and are hinged and adjustably connected at their other ends 13 to the floating weights 4.

In the particular arrangement shown in the drawings, two counterbalance weights are connected to each other by a distance piece 14. The number, weight and positions of the counterbalances may, however, be varied as required, to suit the particular location and operating parameters.

The floating weights 4 are also connected, by chains or cables 5 to the weir plate, the chains or cables 5 passing over freely rotating pulley wheels 6 which are mounted on vertically sliding lifting blocks 7. The lifting blocks 7 can be raised or lowered in tandem by lift spindles 8 which are operated by a removable hand crank 15 via a worm gear 11 turning a pair of lift nuts 10 mounted on thrust blocks 9 attached to the frame 1. The hand crank 15 can be removed for security. The mode of operation of the weir by means of the hand crank 15 provides a means for operating the weir manually overriding the automatic action and enabling the weir to be fixed in, for example, its fully open or its fully closed position as required, regardless of the flow conditions.

The pulley wheels 6 and their lifting gear are clear of the water surface at all possible degrees of weir opening, thus avoiding clogging. The upstream edges of the tilting weir and the ends of the floating counterbalance weights 4 can be profiled to reduce clogging by any floating material and to improve flow through the weir. The curved profile will be determined by the material of manufacture. The material used for the sides of the weir plate will determine how a curve away from the direction of flow can be provided The horizontal top member of the frame 1 is bolted to the vertical side members to allow for complete access to the lifting gear, should this be necessary.

Figure 9:
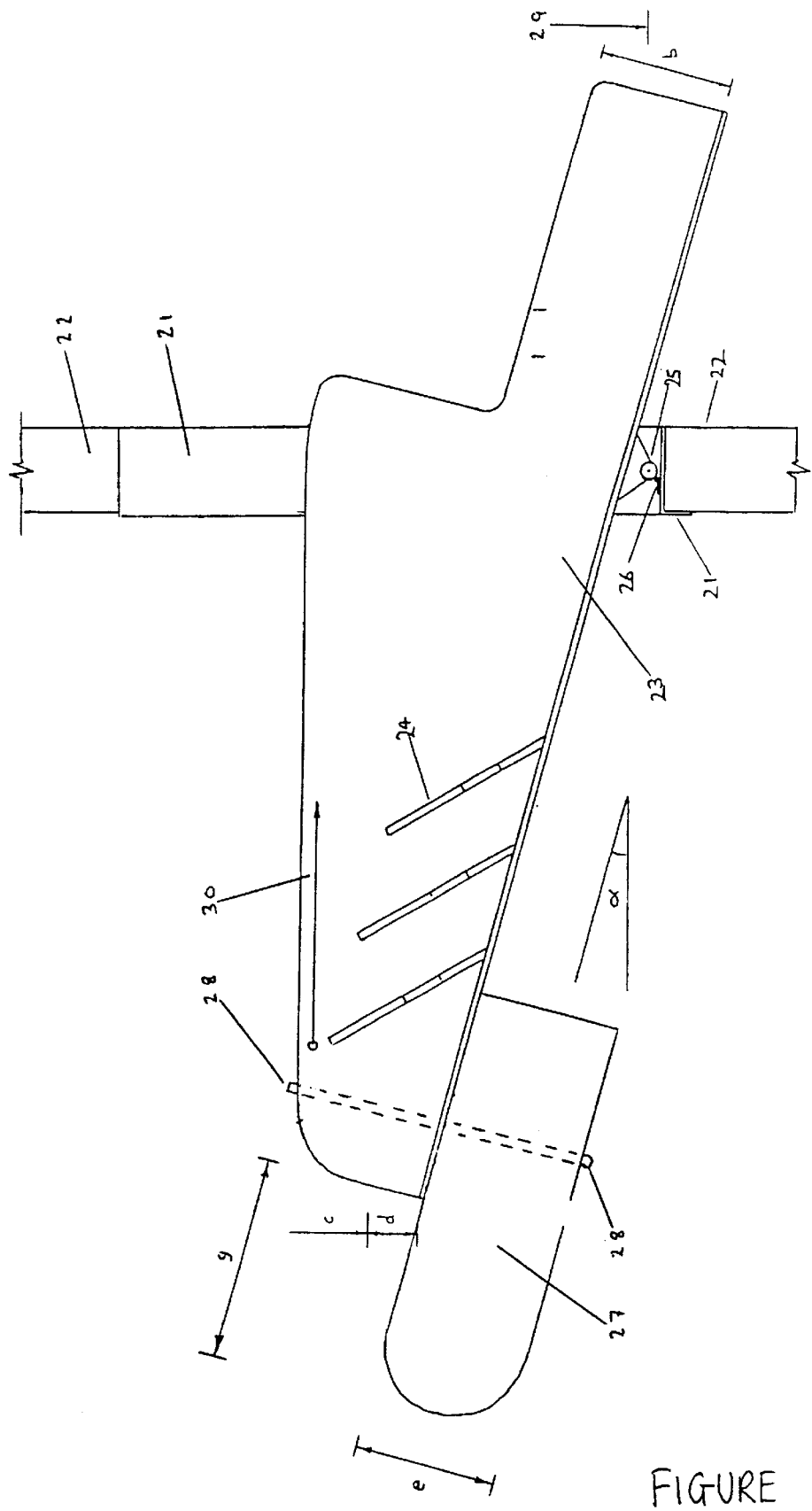
FIG. 9 is a sectional view of the fishway.
Figure 10:
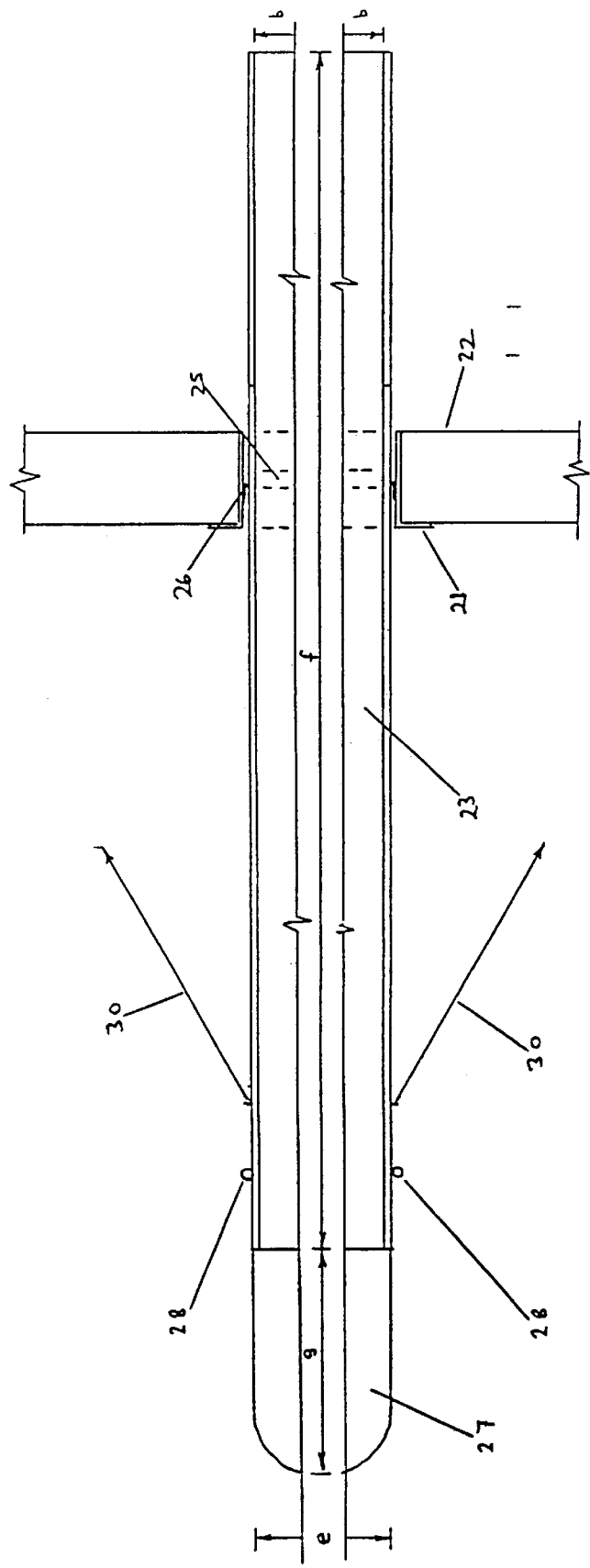
FIG. 10 is a plan view of the fishway.
Figure 11:
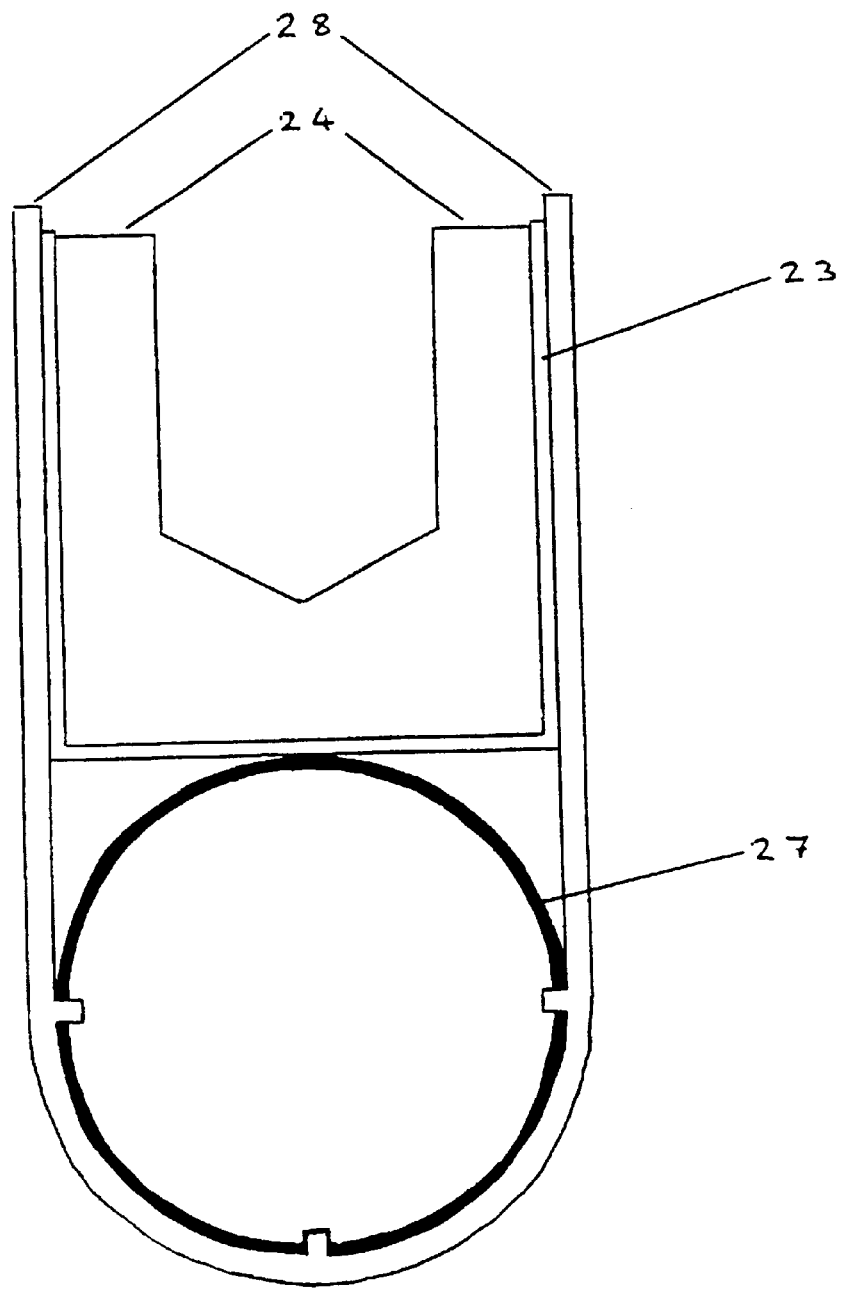
FIG. 11 is a cross-sectional view of the fishway.
Figure 12:
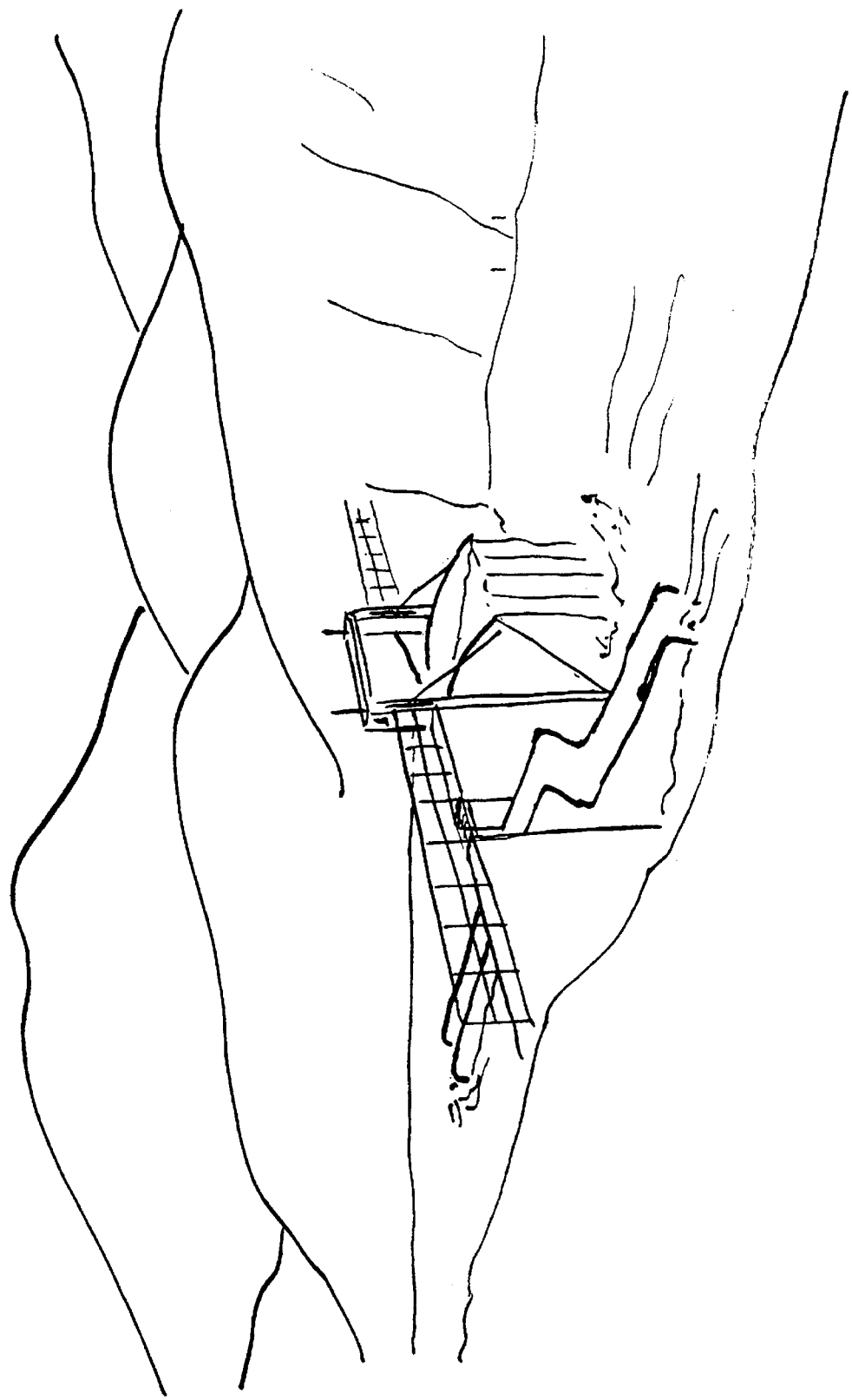
FIG. 12 is a pictorial view showing the fishway of FIGS. 9, 10 and 11 located alongside the weir of FIGS. 2 to 8.

FIGS. 9, 10 and 11 are views of a self-regulating fishway. The upstream water level is regulated so that the maximum recommended incline is not exceeded for the specific fish pass profile which is utilised. The construction of the fishway is such that, by action of its floats, the self-regulating fishway automatically adjusts its upstream sill level to the required depth relative to the upstream water level. The water then flows down the self-regulating fishway at the required depth to suit the fish pass profile that is being employed.

The lower end of the fishway is constantly immersed below the downstream water level, being so designed as to be of sufficient length to ensure a continuous water link between the regulated upstream level and the lowest predicted downstream level, thus preserving continuous fish-attracting flow. The lower end of the fishway also acts as a partial counter-balance, reducing the design size of the upstream float or floats.

Referring now specifically to FIGS. 9, 10 and 11, these show a self-regulating fishway which comprises a rectangular frame 21 set in a headwall 22 and a rectangular section tilting chute 23. A fish pass profile 24 is fitted in the chute 23 which is pivotally connected at 25 to the frame 21. Commercially available rubber profiles 26 are used to seal the pivot shaft and chute sides to the frame 21. Cables 30 may also be used to connect the upper end of the fishway to the headwall or other convenient point to maintain the desired alignment with the upstream flow.

A bulb profile 27 is provided at the upper or upstream end of the chute 23 and may incorporate one or more floats. Each float may be partially filled with water, the bulb 27 and floats being interconnected to maintain level filling using the generally U-shaped filler/air bleed pipes 28.

The self-regulating fishway shown in FIGS. 9, 10 and 11 provides the average incline, water velocity and fish-attracting flow features needed for the specified fish pass profile 24, by maintaining the upstream entrance sill level at the required depth relative to the upstream water level and a continuous water link with the lowest predicted water level at the downstream entrance. The fishway will not use more water than is required by the fish pass profile 24 and flow for the specified fish pass profile is available continuously, providing a constant water link and exit water velocity sufficient to attract the required fish species at all times. Self-regulation of the fishway minimises operation costs and the fishway is of modular form allowing prefabrication off-site using stainless steel or synthetic plastic materials, thus reducing construction and maintenance costs. Floating debris tends to be diverted by the bulb action on the flow.

Site factors and the required fish pass profile dictate dimensions as follows:
1) maximum/minimum angle of incline $\alpha$,
2) minimum width and height b of chute 23,
3) maximum/minimum upstream water level c,
4) water depth d over fishway entrance sill,
5) size e of the bulb 27 and the float or floats, and
6) lengths f of the upstream and downstream sections of the chute 23, and
7) the upstream projection g of the bulb 27.

The self-regulating weir of FIGS. 2 to 8 working in parallel with the self-regulating fishway of FIGS. 9 to 11 offers reasonably accurate and flexible controls of relative levels and flow for the benefit of migratory fish.

What is claimed is:

1. A counterbalanced, self-regulating tilting weir comprising a tiltable weir gate over which the water flows, the weir gate being hinged at its lower edge to the base of a support frame and counterbalanced by float means located upstream of the weir gate so that the level of the weir is raised in response to a fall in the water level upstream of the weir gate, the weir gate being connected to the float means by chains or cables which pass over pulley wheels, and means being provided for effecting vertical movement of the pulley wheels relative to the support frame.

2. A weir as claimed in claim 1, in which the means for effecting vertical movement of the pulley wheels comprise vertical lift spindles.

3. A weir as claimed in claim 2, in which the vertical lift spindles are operated, via a worm gear, by means of a removable hand crank.

4. A weir as claimed in claim 1, in which means are provided for adjustment of operating angles of the chains or cables.

5. A weir as claimed in claim 1, in which means are provided for operating the weir manually, overriding automatic action and fixing the weir either fully open or fully closed as required, regardless of flow conditions.

6. A weir as claimed in claim 1, in combination with a self-regulating fishway comprising a tiltable chute containing a fish pass profile, the chute being arranged for tilting movement by one or more floats positioned at or adjacent to the upstream end of the chute so that required relative water level is maintained at the chute entrance, the upstream water level being so regulated by the weir that the chute incline does not exceed a maximum desirable level for a specific fish pass profile which is used.

7. The combination of a weir and fishway as claimed in claim 6, in which the float or floats at the upstream end of the chute incorporate a submersed buoyant bulb profile extending upstream of the chute entrance.

8. The combination of a weir and fishway as claimed in claim 7, in which cables are attached to both sides of the upstream end of the chute in order to maintain a desired alignment of the fishway with a normal flow.

* * * * *